(12) United States Patent
Krajewski

(10) Patent No.: US 12,097,674 B2
(45) Date of Patent: Sep. 24, 2024

(54) RELATING TO LENSES

(71) Applicant: Tobii AB, Danderyd (SE)

(72) Inventor: Marcin Krajewski, Dietikon (CH)

(73) Assignee: Tobii AB, Danderyd (SE)

(*) Notice: Subject to any disclaimer, the term of this patent is extended or adjusted under 35 U.S.C. 154(b) by 0 days.

(21) Appl. No.: 18/258,887

(22) PCT Filed: Jan. 21, 2022

(86) PCT No.: PCT/EP2022/051408
§ 371 (c)(1),
(2) Date: Jun. 22, 2023

(87) PCT Pub. No.: WO2022/157340
PCT Pub. Date: Jul. 28, 2022

(65) Prior Publication Data
US 2023/0390972 A1    Dec. 7, 2023

Related U.S. Application Data

(60) Provisional application No. 63/139,936, filed on Jan. 21, 2021.

(51) Int. Cl.
| | | |
|---|---|---|
| *B29C 39/26* | (2006.01) | |
| *B29C 33/38* | (2006.01) | |
| *B29C 39/02* | (2006.01) | |
| *B29C 39/10* | (2006.01) | |
| *B29D 11/00* | (2006.01) | |
| *G02B 1/12* | (2006.01) | |
| *B29K 105/00* | (2006.01) | |
| *B29L 11/00* | (2006.01) | |

(52) U.S. Cl.
CPC ........ *B29D 11/00567* (2013.01); *B29C 33/38* (2013.01); *B29C 39/026* (2013.01); *B29C 39/10* (2013.01); *B29C 39/26* (2013.01); *G02B 1/12* (2013.01); *B29K 2105/0002* (2013.01); *B29L 2011/0016* (2013.01)

(58) Field of Classification Search
None
See application file for complete search history.

(56) References Cited

U.S. PATENT DOCUMENTS

| 5,178,801 A | 1/1993 | Shimizu et al. |
| 7,399,176 B2 | 7/2008 | Probst |
| 10,201,942 B2 | 2/2019 | Piotrowski et al. |

(Continued)

FOREIGN PATENT DOCUMENTS

| CN | 104150746 A | 11/2014 | |
| EP | 0637491 A1 * | 2/1995 | ............. B29C 39/42 |

(Continued)

OTHER PUBLICATIONS

Machine translation EP_0637491_A1 (Year: 1995).*

(Continued)

*Primary Examiner* — Robert J Grun
(74) *Attorney, Agent, or Firm* — Noréns Patentbyrå AB

(57) ABSTRACT

A method of forming a polymer is disclosed. The method comprises: positioning a mould in relation to a bath containing a molten material to form a mould cavity between the mould and the molten material; adding a monomer within the mould cavity; and curing the monomer to form a polymer.

22 Claims, 7 Drawing Sheets

(56) References Cited

U.S. PATENT DOCUMENTS

| | | |
|---|---|---|
| 2007/0124919 A1 | 6/2007 | Probst |
| 2008/0008799 A1* | 1/2008 | Zuger .................. A22C 7/0069 99/464 |
| 2014/0084663 A1 | 3/2014 | Todd |
| 2014/0120195 A1 | 5/2014 | Ploskonka |
| 2014/0293217 A1 | 10/2014 | Ogaya et al. |
| 2016/0176131 A1 | 6/2016 | Ihara et al. |
| 2019/0091906 A1 | 3/2019 | Bopp et al. |
| 2019/0352209 A1 | 11/2019 | Iga et al. |
| 2020/0070453 A1 | 3/2020 | Piotrowski et al. |

FOREIGN PATENT DOCUMENTS

| | | |
|---|---|---|
| JP | H06171960 A | 6/1994 |
| JP | H06321566 A | 11/1994 |
| JP | H08267504 A | 10/1996 |
| JP | H08319125 A | 12/1996 |
| JP | 2004025858 A | 1/2004 |
| JP | 2007245515 A | 9/2007 |
| KR | 20150076095 A | 7/2015 |
| WO | 2018087011 A1 | 5/2018 |
| WO | 20180087011 A1 | 5/2018 |

OTHER PUBLICATIONS

Mor Elgarisi, Valeri Frumkin, Omer Luria, and Moran Bercovici: "Fabrication of freeform optical components by fluidic shaping", Nov. 18, 2021 (Nov. 18, 2021),XP055913614, URL:https://opg.optica.org/optica/fulltext.cfm?uri=optica-8-11-1501&id=464960.

Written Opinion in PCT/EP2022/051408, published as WO2022/7157340 on Jul. 28, 2022.

International Search Report in PCT/EP2022/051408, published as WO2022/7157340 on Jul. 28, 2022.

Non-final Office Action, corresponding U.S. Appl. No. 17/581,230 dated Jun. 18, 2024, USPTO.

Communication about intention to grant a European patent dated Oct. 19, 2023 in corresponding European application 22701264.8 EPO.

Non-final Office Action, corresponding U.S. Appl. No. 17/581,230 dated Aug. 16, 2023, USPTO.

* cited by examiner

RELATING TO LENSES

TECHNICAL FIELD

The present invention relates to improvements in the manufacture and evaluation of lenses. More specifically, it relates to lenses formed using a monomer material cast between two forms.

BACKGROUND ART

Lens formation can be a complicated process. This is especially the case where lenses are formed in a layered manner using a film or foil, such as PMMA, and a cast lens material, such as a UV-curable monomer. Cast lenses with embedded films can be produced applying the method disclosed in WO2018/087011 A1. Known processes for lens formation are limited to casting between two solids, or between a solid and a gas, for example air, or a vacuum. Such processes have many drawbacks, which the present application seeks to overcome.

STATEMENTS OF INVENTION

According to a first aspect, there is provided a method of forming a polymer, comprising:
 positioning a mould in relation to a bath containing a molten material;
 adding material between the mould and the bath; and
 curing the material to form a polymer.

The invention therefore provides for an improved method of forming a polymer that provides an enhanced surface finish on one surface of the polymer. It is considered that the word "mould" can include not only moulds that are not intended to be a part of a final product and are therefore to be discarded, but also substrates that are intended to be a part of a final product.

The method may further comprise a step of solidifying at least part of the molten material after curing the monomer. The solidified at least part of the molten material may form a handle, holder, or protective casing. By solidifying some or all of the molten material, it may be easier to both transport the polymer with or without the attachment of the mould. For example, the solidified material may provide protection and/or rigidity to the polymer.

The mould may be positioned using a flotation device that is supported by the molten material and that is configured to hold the mould in a set position relative to the molten material. The use of a flotation device ensures that the mould is held level relative to the surface of the molten material and at a desired angle that is set by the connection between the mould and the flotation device. The flotation device may be toroidal or ring-shaped. Alternatively, the flotation device may take any other shape.

The flotation device may be rigidly connected to the mould and may form a part of the mould. For example, the flotation device may form one or more walls of the mould, such as the side walls, whilst the mould forms other walls, such as an upper wall that interconnects the side walls. The mould and flotation device may be integrally formed as one component.

The mould may be adjustable in position relative to the flotation device. The mould may be moveably connected to the flotation device such that a user can adjust the position of the mould relative to the flotation device. Thus, whilst the flotation device remains fixed in position relative to the molten material, the mould may be moved relative to the molten material to change the shape and/or size of the mould cavity, i.e. the space between the mould and the molten material. The shape and size may be changed, for example, by altering a vertical distance between the mould and the molten material or by altering an angle of the mould relative to the molten material. The adjustability may be provided by any form of adjustment device including, for example, moveable joints such as ball and socket joints, hinges, sliders, ratchets, etc.

The method may further comprise the step of adjusting the position of the flotation device relative to the molten material by adding or removing ballast on the flotation device. This may be considered to be a part of the step of positioning the mould relative to the molten material. Ballast may be applied evenly over the flotation device in order to raise or lower the flotation device in the molten material, i.e., to adjust its overall buoyancy. Alternatively, ballast may be applied unevenly over the flotation device in order to alter its orientation relative to the molten material, i.e., to adjust its local buoyancy.

The step of adding the monomer may be executed through ports in the mould and/or flotation device. By adding the monomer through ports, the monomer may be added with the mould cavity in its intended position relative to the molten material. The mould may be tilted whilst the monomer is added. Where a flotation device is also used, the mould and/or the flotation device may be tilted. This may assist with the avoidance of bubbles or air gaps within the mould cavity. For example, the tilting of the mould may allow the monomer to be added to a port that is tilted to be lower than its resting position whilst allowing air or gas within the mould cavity to escape through a port that is tilted to be higher than its resting position.

The method may further comprise the step of forming a surface pattern on the molten material prior to the curing of the monomer. By forming a pattern on the surface of the molten material, the pattern may be transferred to the monomer when it cures, making a pattern on the cured polymer. The surface pattern may be formed by way of an ultrasonic emitter. The ultrasonic emitter may be applied such that it directs ultrasonic waves through the molten material and may, for example, be positioned at an edge of the bath.

The method may further comprise the step of embedding an object in the monomer, prior to curing. The object may be embedded on the surface of the monomer or may be embedded within the monomer. The object may be positioned by way of one or more spacers. The object may be, for example, a foil, hologram, decorative element (e.g. jewellery, logos, etc.), electronic component, or other such object.

The method may further comprise the step of positioning, prior to curing of the monomer, a secondary mould that bounds the mould cavity, the secondary mould being supported by the molten material. The use of a secondary mould may allow the creation of a greater variety of polymer shapes.

According to a second aspect of the invention, there is provided a system for forming a polymer, the system comprising:
 a bath containing a molten material; and
 a mould positioned in relation to the bath in order to form a mould cavity between the mould and the molten material, for the receipt of a monomer.

The system may further comprise a flotation device that is supported by the molten material and is configured to hold the mould in a set position relative to the molten material.

The mould may be adjustable in position relative to the flotation device. The flotation device may comprise a support structure including one or more joints to allow the adjustment of the position of the mould.

The system may further comprise ballast that is movable to adjust the position of the flotation device relative to the molten material.

The mould and/or flotation device may include ports for the addition of monomer.

The system may further comprise a device configured to form a surface pattern on the molten material. The device may comprise an ultrasonic emitter.

The system may further comprise a secondary mould that bounds the mould cavity, the secondary mould being supported by the molten material.

BRIEF DESCRIPTION OF THE DRAWINGS

Specific embodiments will now be described in detail with reference to the accompanying drawings, in which.

DETAILED DESCRIPTION

Known methods of forming polymer lenses utilise two super-polished moulds—often made of glass but which may also be made of carbide, etc. (in case of thermal curing)—that are aligned together. Liquid monomer can be inserted between the moulds and then hardened using UV irradiation in order to form a lens. With this process, separation of the lens from the mould is a known problem, as has been noted in the above sections. In particular, separation of the mould from the lens can cause deformation of the lens, or may damage the mould and/or lens. As polishing is often an expensive process, the mould is often a considerable price factor. The method described below reduces the number of polished moulds that are required by a factor of two.

It may be beneficial for the described methods to be utilised to cast products where at least one of the sides is flat, and/or to be used where the monomer is to be formed without embedded objects (such as foil, holograms, jewellery, logos, electronics), either inside or on the surface. There is also potential for the disclosed method to be used to cast something on a substrate (mould) without the intention of removing the substrate (mould), for example in surface coating or laminating.

In particular, the described method may be used to form a plano-conex, plano-concave, or bi-plano lens, or to laminate such a layer on a UV transparent substrate, with several advantages. Furthermore, not only flat but also certain patterns are possible.

Whilst the present method may be considered to be similar to float glass production, where a molten metal such as tin is used as a high surface quality support for a molten glass, known method of float glass production are not suitable for the organic polymers commonly used to produce optics. This is at least partly due to the high temperatures involved, which are prone to damage the organic material and/or trigger polymerisation earlier than is intended.

Figure 1:
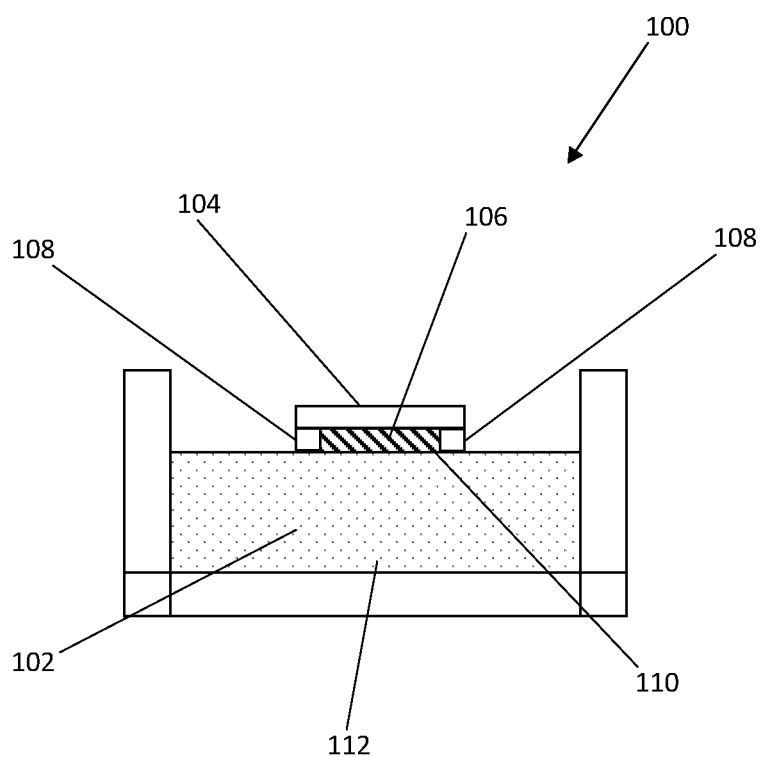
FIG. 1 is a schematic view of a first assembly for moulding a lens.
Figure 2:
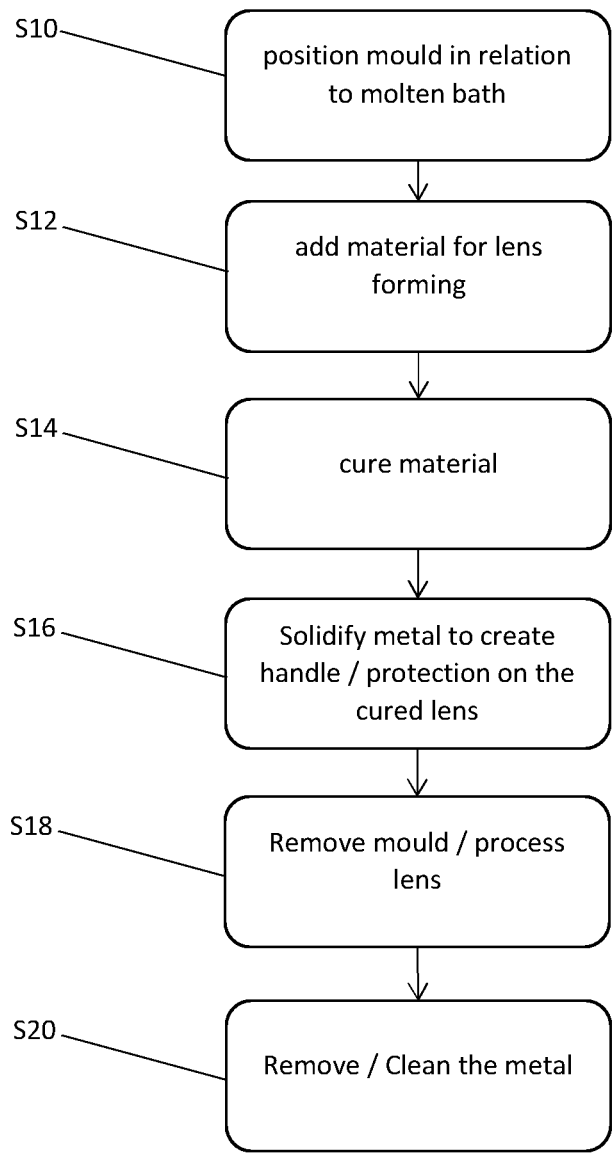
FIG. 2 is a flow chart of a method for moulding a lens.

The disclosed method of forming the lens includes the use of a low-melting point metal, alloy, or other material in order to form a molten bath 102 on which the lens can be formed, as shown in FIGS. 1 and 2. Example low-melting point materials include Woods metal, Fields metal, Cerrolow®, gallistan, and NaK. Other materials may also be suitable, such as mercury, although these may have downsides such as high toxicity. By using this method, fewer moulds may be required. It may even be possible to provide the method without a top mould, such that the lens is simply formed on the surface of the molten bath. The molten bath may be used in conjunction with a UV-curable or thermally-curable monomer, resulting in at least one good quality surface on the side of the resulting cured sample that was in contact with the molten material.

The softness of the molten metal bath allows the casting of even a fragile object on a substrate—i.e. the top mould—even if the substrate were to be too soft or fragile to survive the traditional demoulding process. In one example, the polymer material may be only 200 microns thick with an diameter, hence its fragility. This is equally applicable when it is desired to laminate a fragile material on a lens, for example, where the removal of two moulds could lead to damage, especially if it is not clear which mould is to be removed first.

The assembly 100 is shown in FIG. 1 and a flow chart outlining the method is shown in FIG. 2. A mould 104 can be positioned S10 relative to the molten bath 102 and then the monomer 106 can be filled S12 between the molten bath 102 and the mould 104, whereupon the monomer 106 may be cured S14, for example by the application of UV light or by increasing the temperature (thermal curing). After curing, the monomer 106 will be referred to as the sample. The assembly 100 of FIG. 1 also includes spacers 108 that are used to enclose the sides of the monomer 106 as well as to ensure correct spacing between the surface of the molten bath 102 and the mould 104. In some cases, it may also be desirable to use an inert gas atmosphere and/or clean the molten metal surface from impurities or oxides prior to filling the mould cavity 110 with monomer. Once cured, the lens, i.e. the cured monomer 106, can be removed from the mould 104 by applying any traditional method. Alternatively, the metal 112 making up the molten bath 102 may be cooled down to allow better demoulding on the mould side. For example, by cooling the metal until it solidifies S16, the metal may hold the cured sample in order to enable removal from the mould S18, i.e. by forming a handle. Once removed, the metal may be reheated to allow easy removal of the sample from the metal S20. After removal of the sample, the metal 112 may be cleaned, allowing its re-use.

The steps of solidifying the metal 112 after the curing of the sample has multiple benefits. For example, the solidified metal can act as an easily removed grip or handle for the sample. This can allow the mould 104 to be simply removed from the other side of the sample, for example, or can serve as protection for transport or downstream processing of the sample. This may be especially useful if the cured sample is thin or otherwise fragile.

As a sidenote to this, it is noted that some metals that could be used for the molten bath 102, such as bismuth-containing alloys, may expand upon cooling or solidifying. It is noted that this volumetric behaviour could be 'tuned' to prevent sample deformation or to utilise the deformation to provide a desired bend in the sample.

Normally, during curing, the monomer shrinks, along with any adhesives used. This is known to produce stresses within the polymer sample, e.g., the lens being produced, and stresses between the sample and the mould. The stresses may lead to partial detachment and therefore an uneven surface on the sample. Similarly, metals commonly shrink upon cooling and solidification. By using metals that do not act is this common way, the method can benefit from preventing or limiting the introduction of these stresses.

It may also be possible to utilise these effects in order to cause desirable bending of the sample. For example, the expansion of the metal upon cooling and solidifying, if designed to do so, could lead to bending of the sample. If the opposing side of the sample could then be polished and then the sample released from the metal, the sample could rebound to its previous shape, causing a lens shape to be formed. This may be desirable in some embodiments.

In some cases, the side of the lens that was in contact with the molten bath may require cleaning, by the use of chemicals or otherwise. This may be particularly advantageous where the material making up the molten bath 102 has an affinity for the surface of the lens, i.e. where the liquid wets the surface of the lens.

Different arrangements of the mould 104 with the molten bath 102 may be provided and some additional examples are shown in FIGS. 3 to 8.

Figure 3:
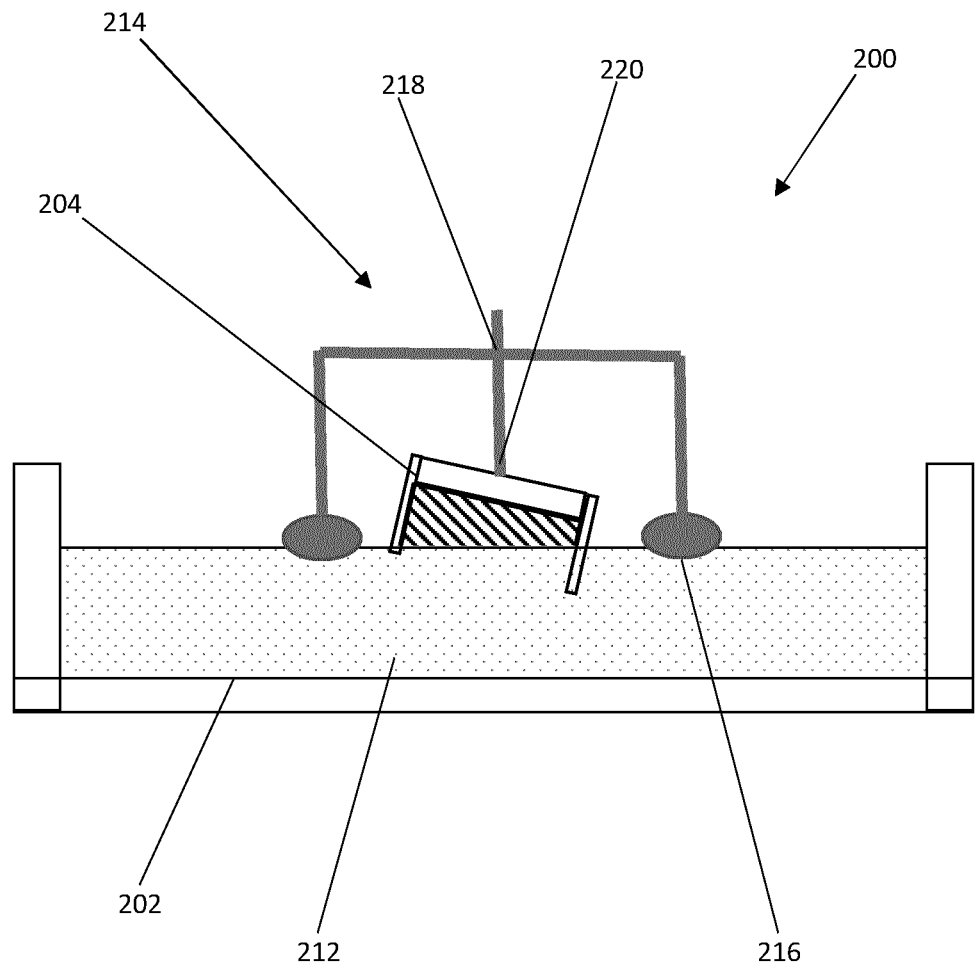
FIG. 3 is a schematic view of a second assembly for moulding a lens.

FIG. 3 shows an embodiment 200 that utilises a self-levelling principle in order to correctly form the desired cured sample. The mould 204 is attached to a support structure 214 that comprises multiple adjustable parts and a flotation device 216. In FIG. 3, the flotation device 216 is formed as a torus of a material that floats on the molten metal 112. The support structure 214 includes a height adjustment means 218 and an angle adjustment means 220 that allows the user to adjust the position of the mould 204 relative to the support structure 214 and therefore, due to the fact that the flotation device 216 will always be seated on the surface of the molten bath 202, to adjust the position of the mould 204 relative to the molten bath 202. In this way, the flotation device 216 ensures that the mould 204 is always held in the desired position for creating the desired monomer sample, i.e. the mould 204 and support structure 214 is self-levelling. Although described as a torus, the flotation device may take many different shapes. In some embodiments, it may be desirable to form the flotation device as a ring, for ease of use and manufacture. However, the flotation device may be a single part, such as a ring, or formed in multiple parts in any other shape.

It will be seen from FIG. 3 that, when the mould is in the angled position, some of the mould may be under the surface of the molten metal. This may be undesirable, for example because it will have its own buoyancy and could affect the level of the flotation device or it could result in some bending of other components, especially when such an arrangement is used in conjunction with a foil or other object to be embedded within the monomer, as described below. In these situations, it may be desirable to trim the part of the mould that is protruding into the molten metal in order to limit the total amount of mould that protrudes, thus limiting or preventing these issues.

It can therefore be seen that the use of a molten bath 202 in the manufacture of cured monomer samples is not only useful in that it can produce a high surface quality on the surface of the sample facing the molten metal 212, but also that it allows the upper mould 204 to be precisely aligned when used with a buoyant flotation device 216. This buoyancy also allows the self-levelling of the mould 204, to a designed angle, if desired.

Figure 4:
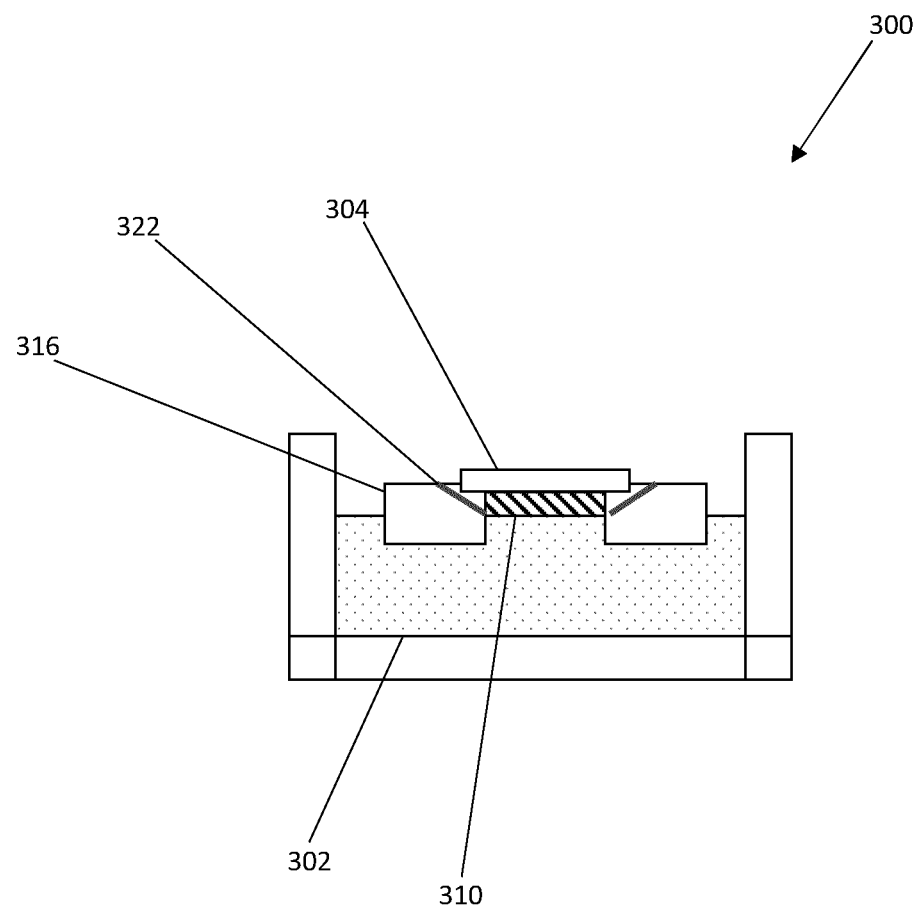
FIG. 4 is a schematic view of a third assembly for moulding a lens.

FIG. 4 shows a further embodiment 300 that utilises the self-levelling principle in a similar way to that of the assembly of FIG. 3. Here, the support structure is replaced with a simpler mechanism, whereby the mould 304 is connected directly to the flotation device 316, which may also form a part of the mould 304, e.g. the spacer at the side of the mould cavity. Due to the simpler nature of the assembly 300, the mould cavity 310 may be adapted by altering the flotation characteristics of the flotation device 316. For example, by adding or removing ballast evenly over the flotation device 316 and/or mould 304, the flotation device 316 and mould 304 can be made to sit lower or higher in the molten metal 312, respectively. The eventual size of the monomer sample produced by the mould 304 can therefore be tuned as desired. Similar, by adding or removing ballast from the system unevenly, e.g. more ballast on the left of the flotation device 316 and less on the right, the flotation device 316 can be made to sit unevenly in the molten bath 304, i.e. for parts of the flotation device 316 to be seated lower in the molten bath 302 than other parts of the flotation device 316. In this way, the overall thickness and the angle of the bottom of a cured monomer sample can be adjusted by altering ballast placed on the flotation device 316 and/or mould 304.

In some embodiments, the mould may be separated from the flotation device. This may be useful when the upper surface is not required to be moulded or after curing when the flotation device may then act as a lens holder, holding the cured sample for removal from the molten bath.

Also shown in FIG. 4 are ports 322 that extend through the flotation device 316 to provide access to the mould cavity 310. These ports 322 can be used for venting and/or filling the mould cavity. In the depicted embodiment, two ports 322 are provided, which are in opposing positions across the mould cavity 310. This arrangement of the ports 322, along with other arrangements where the ports 322 are not adjacent to one another, can provide advantageous effects when using one port 322 for filling and another for venting. For example, by angling the flotation device 316 and mould 304 such that the filling port is lower than the venting port, bubble formation may be limited or prevented. The ports may also be allowed to be bigger than the would otherwise be possible in more usual arrangements for creating polymer lenses. In further embodiments, it may be possible to place the monomer on the molten metal and then to position the mould and flotation device around the monomer, such that the monomer may flow into the mould or be drawn into the mould, for example by surface tension. This may allow quicker filling of the mould.

Figure 5:
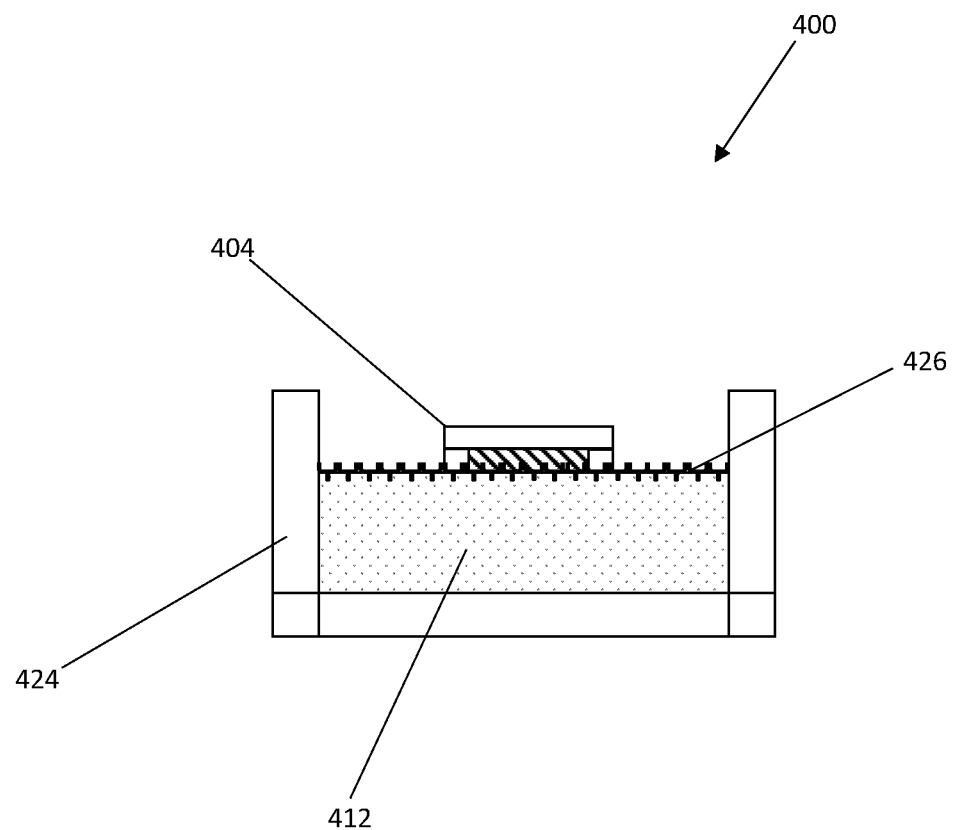
FIG. 5 is a schematic view of a fourth assembly for moulding a lens, including surface patterning.

FIG. 5 shows a further embodiment 400 whereby a surface pattern may be created on the surface of the sample that is on the side of the molten metal 412. The assembly 400 is similar to that of FIG. 1, but additionally includes an ultrasound generator 424 that acts to create a surface wave pattern 426 in the molten metal 412. Other forms of wave generation may also be used and will be known to the skilled person. In one embodiment, as shown, the ultrasound generator 424 emits a frequency such that a standing wave is formed in the top of the molten metal 412. The formation of the standing wave results in an imprint of the pattern on the monomer, which can then be cured in order to retain the surface pattern on the sample when removed from the mould 404. Of course, by varying the application of the ultrasound, such as by changing frequency, amplitude, or phase of one or more ultrasound heads/generators 424, the surface pattern may be caused to form any number of different patterns. Such design is known in the art.

Figure 6:
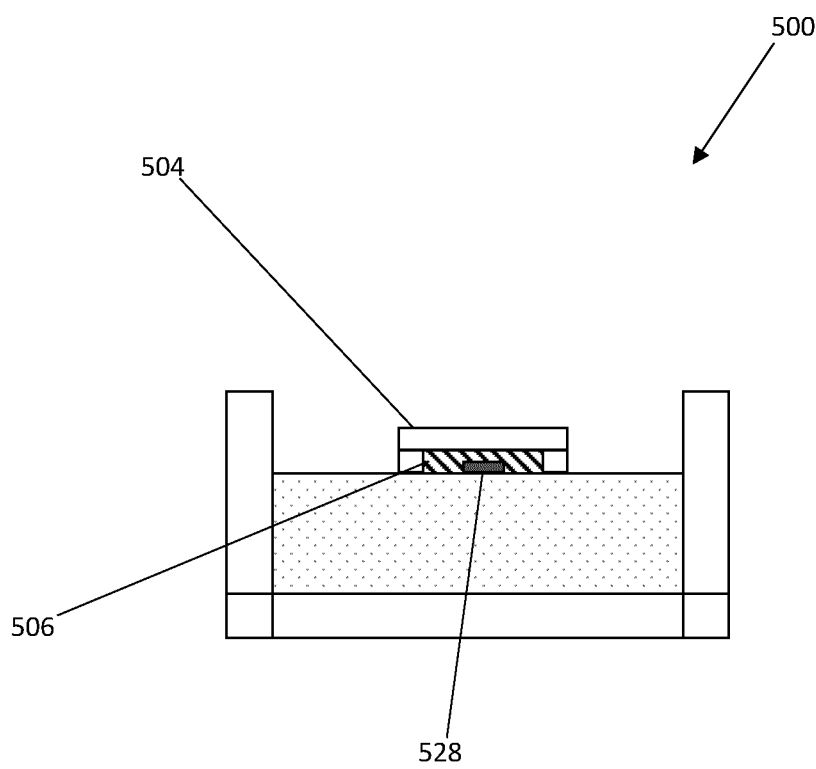
FIG. 6 is a schematic view of a fifth assembly for moulding a lens, including embedding of an object on the lens surface.
Figure 7:
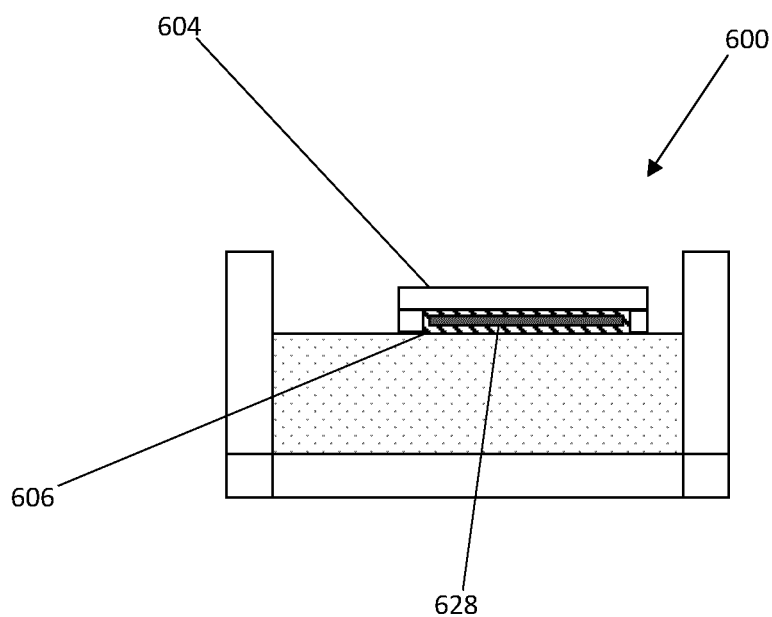
FIG. 7 is a schematic view of a sixth assembly for moulding a lens, including embedding of an object within the lens.

FIGS. 6 and 7 show arrangements 500, 600 that are again similar to that of FIG. 1, but additionally include an object 528, 628 that is to be embedded in the monomer sample, once cured. In the depicted embodiments 500, 600, the object 528, 628 is a foil, but the object 528, 628 may also include other objects such as a holograms or other such objects mentioned previously.

In FIG. 6, the object 528 is positioned on the surface of the molten metal in order that, once the monomer 506 is cured, the object 528 will be on the surface of the sample. Conversely, the object 628 in FIG. 7 is positioned within the monomer 606 itself. The object 528, 628 may be positioned such that it is floating freely within or upon the monomer 506, 606, prior to curing, or spacers may be used that hold the object 528, 628 relative to the mould 504, 604, in the desired position within the monomer 506, 606. The position may of course be controlled in both lateral and vertical directions, whichever method is used to hold the object.

Figure 8:
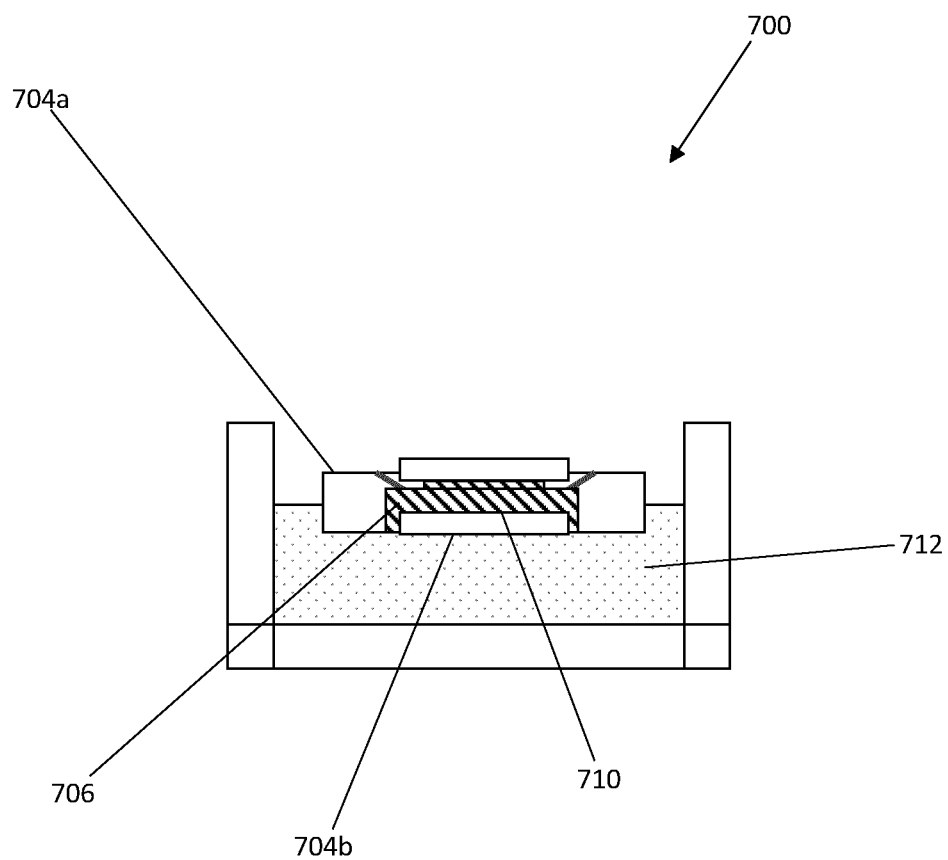
FIG. 8 is a schematic view of a seventh assembly for moulding a lens.

FIG. 8 depicts a further embodiment 700 whereby two moulds 704a, 704b are positioned on the molten metal. A larger mould 704a is positioned around a smaller mould 704b, creating a mould cavity 710 that is enclosed by the moulds 704a, 704b and the molten bath 702. Each of the moulds 704a, 704b include integrally a flotation device such that they are each independently self-supporting on the molten metal 712. In this way, the monomer 706 can be injected between the moulds 704a, 704b in order to be shaped. The thickness of the monomer 706 can be adjusting by adding or removing ballast (not shown) from one or both flotation devices in order to adjust how each sits within the molten metal 712. In some embodiments, it may also be desirable to ensure accurate positioning of the smaller mould 704b within the larger mould 704a by the use of one or more spacers. It is also possible to combine this embodiment with the teachings related to FIGS. 6 and 7 in order to position a foil or other object on or within the monomer 706.

Of course, while the embodiment of FIG. 8 may not result in a reduced number of moulds when compared with alternative methods of manufacture, the other benefits of the invention will still apply.

Whilst the disclosed method may be particularly useful in the case where the sample is to be removed from the mould, such as in lens manufacture, it may also be used in other circumstances. For example, the method could be utilised to allow coating or laminating of a sample over a substrate, for example where the mould as shown in the Figures is a substrate that is not intended for removal. This may be particularly useful in applications such as the manufacture of waveguides, microwave circuits, pneumatic/fluidic circuits, stamps, etc. When used in conjunction with UV curing, for example, the present technique provides similar imaging techniques to be used as with lithography, i.e., the printing of complex patterns. In addition, the present technique may allow a better surface finish and a larger thickness of the end sample than would be possible using lithography.

It will be clear that, unless specifically stated otherwise, any one or more features disclosed in relation to one embodiment of the invention may be used in conjunction with any one or more features from any other embodiment or embodiments of the invention. For example, the self-levelling features of the embodiment of FIG. 3 may be used in conjunction with the foil position of the embodiments of FIGS. 6 and 7 and/or an additional mould as in the embodiment of FIG. 8. As a further non-limiting example, any of the embodiments may be combined with the surface patterning feature of the embodiment of FIG. 5. This applies to each and every embodiment and is not limited to the specific examples discloses herewith.

The invention claimed is:

1. A method of forming a polymer, comprising:
   positioning a mold in relation to a bath containing a molten material to form a mold cavity between the mold and a top surface of the molten material, wherein the molten material forms one wall of the mold cavity and forms a shaping surface for the cured monomer;
   adding a monomer within the mold cavity;
   curing the monomer to form a polymer; and
   solidifying at least part of the molten material after curing the monomer.

2. The method of claim 1, wherein the solidified at least part of the molten material forms a handle, holder, or protective casing.

3. The method of claim 1, wherein the mold is positioned using a flotation device that is supported by the molten material and that is configured to hold the mold in a set position relative to the molten material.

4. The method of claim 3, wherein the mold is adjustable in position relative to the flotation device.

5. The method of claim 3, further comprising the step of adjusting the position of the flotation device relative to the molten material by adding or removing ballast on the flotation device.

6. The method of claim 3, wherein the step of adding the monomer is executed through ports in the mold and/or flotation device.

7. The method of claim 6, wherein the mold and/or flotation device is tilted while the monomer is added.

8. The method of claim 1, further comprising the step of forming a surface pattern on the molten material prior to the curing of the monomer.

9. The method of claim 8, wherein the surface pattern is formed by way of an ultrasonic emitter.

10. The method of claim 1, further comprising the step of embedding an object in the monomer, prior to curing.

11. The method of claim 10, wherein the object is embedded on the surface of the monomer or within the monomer.

12. The method of claim 10, wherein the object is positioned by way of one or more spacers.

13. The method of claim 1, further comprising the step of positioning, prior to curing of the monomer, a secondary mold that bounds the mold cavity, the secondary mold being supported by the molten material.

14. A system for forming a polymer, the system comprising:
   a bath containing a molten material; and
   a mold positioned in relation to the bath in order to form a mold cavity between the mold and a top surface of the molten material, for the receipt of a monomer, wherein the molten material forms one wall of the mold cavity and forms a shaping surface for the cured monomer.

15. The system of claim 14, further comprising a flotation device that is supported by the molten material and is configured to hold the mold in a set position relative to the molten material.

16. The system of claim 15, wherein the mold is adjustable in position relative to the flotation device.

17. The system of claim 16, wherein the flotation device comprises a support structure including one or more joints to allow the adjustment of the position of the mold.

18. The system of claim 14, further comprising ballast that is movable to adjust the position of the flotation device relative to the molten material.

19. The system of claim 14, wherein the mold and/or flotation device include ports for the addition of the monomer.

20. The system of claim 14, further comprising a device configured to form a surface pattern on the molten material.

21. The system of claim 20, wherein the device comprises an ultrasonic emitter.

22. The system of claim 14, further comprising a secondary mold that bounds the mold cavity, the secondary mold being supported by the molten material.

* * * * *